Nov. 30, 1965  T. HORVATH  3,220,284

CONTROL MEANS FOR PLANETARY TRANSMISSION

Filed May 13, 1963  3 Sheets-Sheet 1

INVENTOR.
TIBOR HORVATH
BY Polachek & Saulsbury
ATTORNEYS

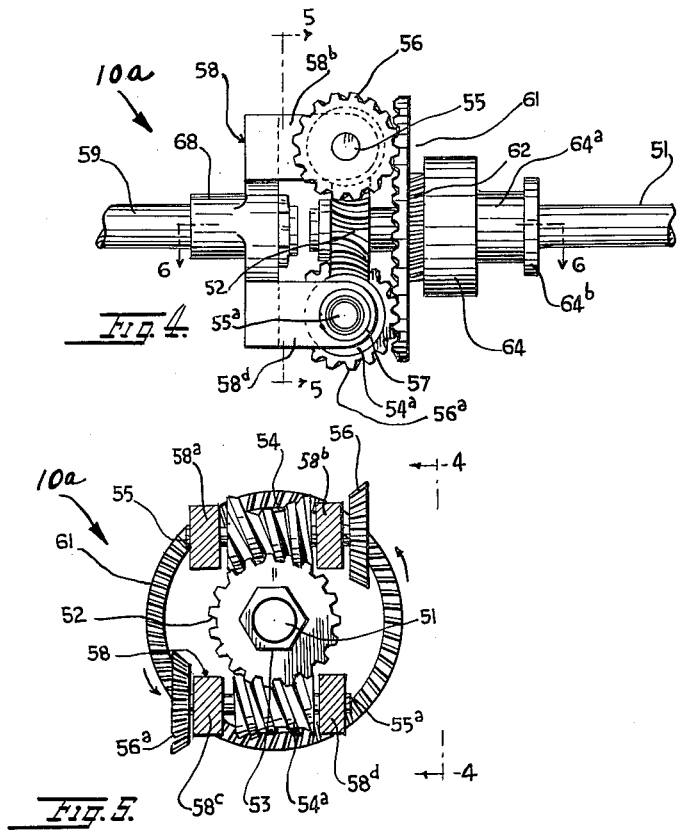
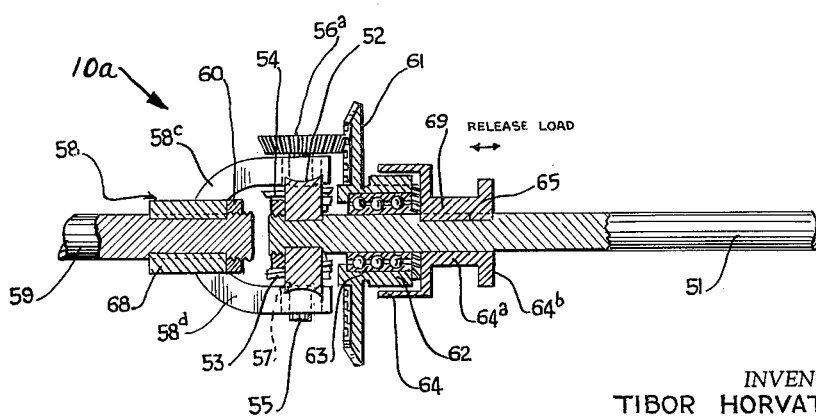

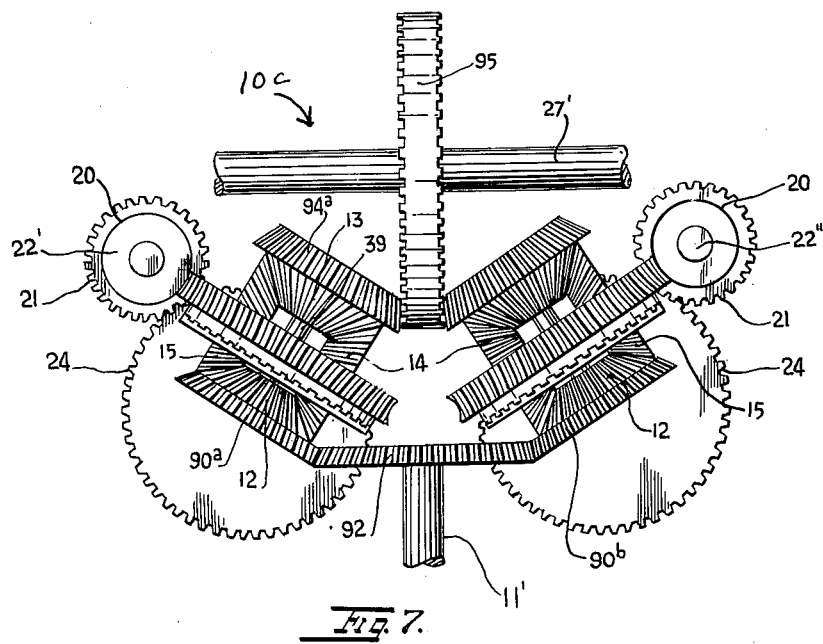

United States Patent Office 3,220,284
Patented Nov. 30, 1965

3,220,284
CONTROL MEANS FOR PLANETARY
TRANSMISSION
Tibor Horvath, 944 Ave. R, Brooklyn, N.Y.
Filed May 13, 1963, Ser. No. 279,709
2 Claims. (Cl. 74—674)

This invention concerns a gear transmission system which is capable of providing an infinite range of speed ratios between a drive shaft and a driven shaft.

One object of the invention is to provide a gear transmission system in which the ratio between drive shaft speed and driven shaft speed can be controlled mechanically by operating an auxiliary control shaft.

A further object is to provide a gear transmission system having two gear assemblies arranged so that a driven shaft can be driven in one direction or a reversed direction, without requiring disengagement of the system from the drive shaft or stopping of the drive shaft.

Another object is to provide a gear transmission assembly which can be used as a braking system, as a speed regulator system, or as an engine speed or torque measuring system.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 4 is a side elevational view of another system embodying the invention, taken on line 4—4 of FIG. 5.

FIG. 5 is a sectional view taken on line 5—5 of FIG. 4.

FIG. 6 is a sectional view taken on line 6—6 of FIG. 4.

FIG. 7 is a top plan view of another gear transmission assembly according to the invention.

Figure 1:
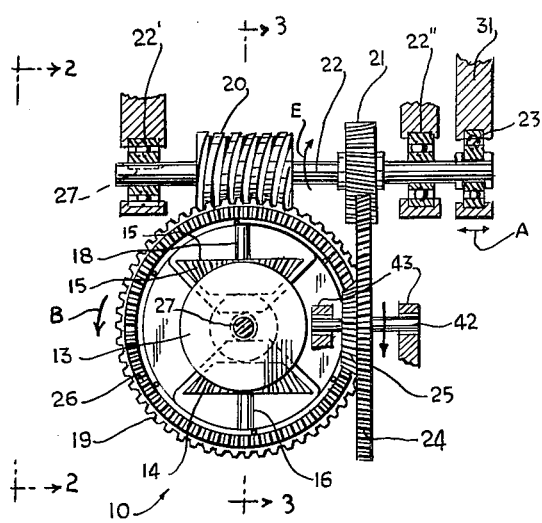
FIG. 1 is an end elevational view of a gear transmission assembly embodying the invention.
Figure 2:
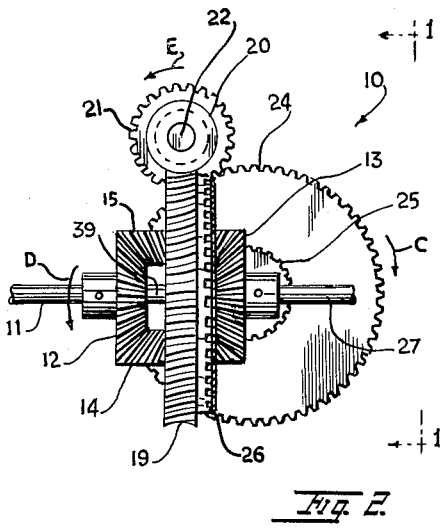
FIG. 2 is a side elevational view taken on line 2—2 of FIG. 1.
Figure 3:
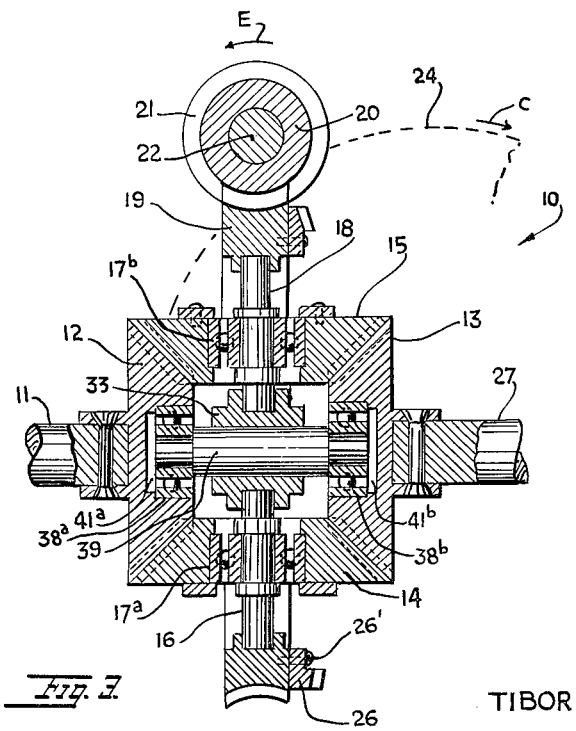
FIG. 3 is a sectional view taken on line 3—3 of FIG. 1.

Referring first to FIGS. 1–3, there is shown shaft 11 which is the drive shaft driven by a prime mover, engine or other power source (not shown). Directly connected to shaft 11 is beveled gear 12. Beveled gear 12 drives beveled gear 13 in the direction opposite to gear 12 through pinion gears 14 and 15. Pinion gears 14 and 15 are rotatably mounted on axially aligned shafts 16 and 18, respectively. Bearings 17$^a$, 17$^b$ support the gears 14, 15 for free rotation with respect to the shafts 16, 18. Shafts 16, 18 extend diametrally inside of a worm gear 19 and are supported thereby. This worm gear has external teeth which mesh with a worm 20.

Worm 20 is secured to a shaft 22 which also carries a gear 21. Shaft 22 is rotatable in bearings 22′, 22″. A bevel gear 26 is located at one side of gear 19 and secured by bolts 26′. Gear 26 meshes with bevel gear 25. Gear 25 is directly connected to large gear 24. Gear 24 meshes with gear 21 on shaft 22, and will rotate worm 20.

Worm gear 19 and worm 20 must have sufficient clearance or play to permit a slight lengthwise motion of shaft 22. Bearing 23 is provided on one end of shaft 12 for engagement by a suitable lever or linkage 31 which can be manually or mechanically actuated to move shaft 12 lengthwise in one direction or another, as indicated by double arrow A.

Driven gear 13 is mounted on the driven shaft 27 which is axially aligned with drive shaft 11. Worm gear 19 has a central hub 33 mounted on a shaft 39. Shaft 39 is supported at opposite ends by bearings 38 to permit free rotation of the shaft 39 and gears 19, 26 with respect to shafts 11, 27. The outer races of bearings 38$a$, 38$b$ of shaft 39 are held in axial bores 41$^a$, 41$^b$ in gears 12 and 13. Gears 24, 25 are carried on a shaft 42 supported in bearings 43.

In operation of the gear system 10, suppose that gear 12 is rotating in counterclockwise direction D as indicated in FIG. 2. Gear 12 will rotate pinion gears 14 and 15 which will in turn carry worm gear 19 with them. This motion of gear 19 can occur only when pressure from gear 19 is transmitted through its associated bevel gear 26. Then gear 26 will turn gear 25, and gear 24 will rotate with gear 25. Gear 24 will turn gear 21 which will turn shaft 22 and idler worm 20, thus preventing the worm from locking gear 19 against rotation. Gear 19 rotates in the counterclockwise direction B of FIG. 1 and worm 20 turns in counterclockwise direction E of FIGS. 1–3. Gear 24 turns in clockwise direction C of FIGS. 1–3.

When shaft 22 is moved slightly axially to the left as viewed in FIG. 1, the worm gear 19 rotates freely. As shaft 22 is moved with gear 21 and worm 20, the pressure is transmitted from the worm gear 19 to the worm by bolts 26′. Gear 26 meshes with bevel gear 25. Gear gear 13, which is loaded via shaft 27, remains stationary. If shaft 22 is moved axially to the right as far as it will go, as viewed in FIG. 1, worm gear 19 will mesh with worm 20 which will stop the motion of gear 19. When gear 19 is stationary, then power is directly transmitted from gear 12 to gear 13 via rotating gears 14, 15. When gear 19 turns gears 14, 15 idle gear 13 and shaft 27 do not turn. Thus the speed of shaft 22 determines the speed ratio of the driven shaft 27 with respect to the drive shaft 11. Driven shaft 27 is connected to a load (not shown).

The gears 21 and 24 may have helically shaped teeth in order to permit relative sliding movement and change in pressure when shaft 22 is moved axially to the right or left. The FIGS. 1, 2 and 3 show it is not necessary to have the teeth of gears 21 and 24 or the teeth of any other gears helically shaped, since worm 20 is itself helically shaped. In this case, the control is done by moving shaft 22 lengthwise with worm 20. If gears 21 and 24 are helically shaped, the same control will be achieved, but with a smaller amount of movement of the shaft.

It will be understood that the axial movement of shaft 22 is very slight, of the order of one-sixteenth of an inch or less. Although its axial movement will be substantially imperceptible, it performs its functions effectively by the pressure which it transmits to the worm 20 in one direction or the other. Sufficient play or clearance in bearings 22′ and 22″ must be allowed to permit this necessary slight axial movement of shaft 22.

In the assembly 10$^a$ of FIGS. 4–6, the drive shaft 51 is connected to a prime mover (not shown). Shaft 51 carries and turns worm gear 52 secured by a nut 53 on the shaft. Worm 54 meshes with worm gear 52 and is carried by a shaft 55. Shaft 55 also supports a pinion gear 56. Shaft 55 is supported by two bearings 57 in two arms 58A, 58B of a yoke 58.

Another worm 54$^a$ is meshed with worm gear 52 in a position diametrically opposed to that of worm 54. Worm 54$^a$ is carried on a shaft 55$^a$ coplanar with shaft 55. Another pinion gear 56$^a$ is carried on shaft 55$^a$. Gears 56 and 56$^a$ mesh with a beveled gear 61 at diametrically opposite points. Shaft 55$^a$ is supported in two other bearings 57 located in two other arms 58C, 58D of yoke 58. Yoke 58 has an axial hub 68 which is connected to driven shaft 59 by a nut 60. Shaft 59 is connected to a load (not shown). Beveled gear 61 is connected to a cylindrical axially extending gear 62 held on shaft 51 by a bearing assembly 63, which permits relative rotation of gears 61, 62 and shaft 51. Bearing assembly 63 is secured to shaft 51.

An internal helical gear 64 meshes with helical gear 62. Gear 64 has a cylindrical hub 64a which rests on shaft 51. A slot 65 is provided in the shaft 51 and hub 64a has a key 69 engaged in the slot so that gear 64 is slidable slightly axially on shaft 51. Gear 64 rotates with shaft 51.

It should be seen that the assembly 10a represents in effect a ratchet system and is able to grip the load without lost motion that is inherent with ordinary ratchet gearing.

The helical gears have teeth cut at such an angle that by moving gear 64 axially to the left in RELEASE direction as viewed in FIGS. 4 and 6, this gear will force beveled gear 61 to turn in the counterclockwise direction of rotation of drive shaft 51 as viewed in FIG. 5. This results in the turning of worms 54, 54a through pinions 56, 56a ahead of worm gear 52. This allows prime drive shaft 51 to rotate more freely than driven shaft 59. By moving gear 64 to the right in LOAD direction as viewed in FIGS. 5 and 6, a reverse action occurs. The worms lock to the worm gear 52 and the drive shaft 51 is then loaded by the driven shaft 59, via yoke 58.

If desired, bearing 63 may be omitted since relative rotation of gears 61 and 62 with respect to shaft 51 will be very small and infrequent. A well lubricated surface provided between shaft 51 and the gear 62 may provide sufficiently free motion. There must be sufficient play between gears 56, 56a and gear 61, and between gears 62, 64, so that gear 64 can move slightly axially in either direction. The amount of pressure applied on gear 64 to the right or left will determine the gear or drive ratio between shafts 51 and 59. An annular flange 64b is provided on hub 64a for application of axial moving force by a suitable linkage or mechanism (not shown).

The assembly 10a differs from assembly 10 of FIGS. 1–3 in the provision of a direct connection between the drive and driven shafts, or between the prime moved and load connected to these shafts respectively. In assembly 10 of FIGS. 1–3, the drive shaft 11 and driven shaft 27 are separated by a central planetary gear arrangement. The reciprocal of the rotating speed of the planetary gear arrangement determines the speed of the driven shaft 27. Furthermore, assembly 10 includes both controlling and controlled central gears, while in assembly 10a the central controlling and controlled gears are omitted. Also in assembly 10a, the controlling gear 64 is carried by the prime drive shaft 51, while the controlled gear 52 is locked to and rotating parallel with the driven shaft.

In FIG. 7 is shown another assembly 10c which employs two assemblies, each similar to assembly 10 shown in FIGS. 1–3. Corresponding parts are identically numbered. In the dual assembly 10c, the drive shaft 11', which is driven by a suitable engine or prime mover, carries a beveled drive gear 92 which meshes with gears 90a, 90b attached to beveled gears 12. Driven beveled gears 13 carry beveled gears 94a, 94b which mesh with an output gear 95 carried on driven shaft 27'. Independent control shafts 22' and 22" are provided for the worms 20. It should be understood that this assembly 10c can have its direction of rotation changed while running, even at higher speeds and without the gearing being disconnected, at the instant the control is operated to change the direction of rotation, deceleration is effected smoothly.

The dual arrangement of assembly 10c permits shaft 27' to be driven in one direction or the other depending on which of the control shafts 22' or 22" is advanced. One half of the assembly 10c will idle while the other half effects transmission of power between drive shaft 11 and driven shaft 27'.

There has thus been provided according to the invention, a gear transmission assembly which provides for an infinite number of speed ratios between the drive and driven shaft, with the desired ratio at any time controlled either automatically or manually. The invention may also be employed in a braking system or speed regulation system. By connecting a suitable gauge to the control shaft 22, the assembly may be also employed in a speed measuring system.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A gear transmission system, comprising: a drive shaft, a driven shaft, a worm gear on said drive shaft, a pair of worms engaged with the worm gear in diametrically opposite positions thereon, a yoke secured to said driven shaft, a pair of other shafts carried by said yoke, said worms being rotatably mounted on said other shafts respectively, pinion gears carried by said other shafts respectively, a beveled gear, a first helical gear secured to and extending axially from said beveled gear, a cylindrical hub slidably mounted on said drive shaft, and an internal helical gear inside said hub, said first helical gear being disposed inside said hub and engaged with the internal helical gear, said pinion gears being engaged with said beveled gear in diametrically opposite positions, whereby axial movement of said hub to one extreme position on the drive shaft locks the worms to the worm gear so that the drive shaft and driven shaft rotate with a one-to-one speed ratio, and whereby axial movement of said hub to another extreme position slightly spaced from said one position removes pressure of the worms on the worm gear to permit free rotation of the worm gear with substantially infinite speed ratio variation between the drive shaft and driven shaft.

2. A gear transmission system, comprising: a drive member, a driven member, a first beveled gear operatively connected to said drive member and driven thereby, a second beveled gear opposed to the first gear and operatively connected to the driven shaft for driving the same, third and fourth opposed beveled gears each meshed with the first and second gears for transmitting driving power therebetween, an annular worm gear having external teeth, said third and fourth gears being rotatably mounted inside of said worm gear, a fifth beveled gear on one side of the worm gear, an axially movable control shaft, a worm on said control shaft meshed with said worm gear, another gear on said control shaft, another shaft, a large gear on said other shaft, and a sixth beveled gear on said other shaft meshed with said fifth beveled gear, whereby axial movement of said control shaft controls relative drive speed of said drive and driven members.

References Cited by the Examiner
UNITED STATES PATENTS
1,564,318  12/1925  Bower _____ 74—793

FOREIGN PATENTS
75,013  8/1932  Sweden.

DON A. WAITE, *Primary Examiner.*